United States Patent
Xia et al.

(10) Patent No.: US 11,062,009 B2
(45) Date of Patent: Jul. 13, 2021

(54) METHOD, DEVICE AND SYSTEM FOR UNLOCKING MOBILE TERMINAL DEVICE

(71) Applicant: HUIZHOU TCL MOBILE COMMUNICATION CO., LTD., Huizhou (CN)

(72) Inventors: Xumin Xia, Huizhou (CN); Xianming Zhuang, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 16/651,407

(22) PCT Filed: Sep. 26, 2018

(86) PCT No.: PCT/CN2018/107601
§ 371 (c)(1),
(2) Date: Mar. 27, 2020

(87) PCT Pub. No.: WO2019/062759
PCT Pub. Date: Apr. 4, 2019

(65) Prior Publication Data
US 2020/0293642 A1    Sep. 17, 2020

(30) Foreign Application Priority Data

Sep. 27, 2017    (CN) .......................... 201710893736.X (51) Int. Cl.
*G06F 21/32*    (2013.01)
*G06F 3/0488*    (2013.01)
*G06K 9/00*    (2006.01)

(52) U.S. Cl.
CPC ............ *G06F 21/32* (2013.01); *G06F 3/0488* (2013.01); *G06K 9/00087* (2013.01)

(58) Field of Classification Search
CPC ....... H04W 12/06; H04W 4/80; H04W 12/02; H04W 88/02; H04W 12/00508; H04W 12/001; H04W 12/08
See application file for complete search history.

(56) References Cited

U.S. PATENT DOCUMENTS

2016/0070897 A1*  3/2016  Lu ...................... G06F 3/04883
                                                      345/174
2018/0144110 A1*  5/2018  Creamer .............. G06F 21/316

FOREIGN PATENT DOCUMENTS

CN    104346074 A    2/2015
CN    104360731 A    2/2015
(Continued)

OTHER PUBLICATIONS

International search report,PCT/CN2018/107601, dated Jan. 4, 2019 (2 pages).

(Continued)

*Primary Examiner* — Kwasi Karikari (57) ABSTRACT

Disclosed are a method for unlocking a mobile terminal device, a mobile terminal device, and a system for unlocking a mobile terminal device. The method comprises: a first sensing apparatus on a mobile terminal device collecting first unlocking information, wherein the first unlocking information is physiological state feature information about a human body; and comparing the first unlocking information with first preset unlocking information, and if the first unlocking information matches the first preset unlocking information, unlocking the mobile terminal device. By means of the method, the present invention can improve the convenience of unlocking a mobile terminal device.

14 Claims, 7 Drawing Sheets

(56) References Cited

FOREIGN PATENT DOCUMENTS

| CN | 106022053 A | 10/2016 |
|----|-------------|---------|
| CN | 106203053 A | 12/2016 |
| CN | 106709301 A | 5/2017  |
| CN | 107908938 A | 4/2018  |

OTHER PUBLICATIONS

First Office Action from China patent office in a counterpart Chinese patent Application 201710893736.X, dated Aug. 19, 2019 (23 pages).

* cited by examiner

METHOD, DEVICE AND SYSTEM FOR UNLOCKING MOBILE TERMINAL DEVICE

TECHNICAL FIELD

The present disclosure relates to the technical field of mobile terminals, and in particular, toan unlocking method for a mobile terminal device, a mobile terminal device, and an unlocking system for a mobile terminal device.

BACKGROUND

A mobile terminal, or called a mobile communication terminal, refers to a computer device that can be used while moving. With the development of networks and technologies towards the direction of broadband more and more, the mobile communication industry will move towards a real mobile informationera. On the other hand, with the rapid development of integrated circuit technologies, processing capabilities of mobile terminals have possessed powerful processing capabilities, and mobile terminals are changing from simple call tools to comprehensive information processing platforms. This also adds broader development space for mobile terminals.

A wearable device is a portable device that is worn directly on a body or is integrated into a user's clothing or accessories. Wearable devices are not only a kind of hardware device, but also realize powerful functions through software support, data interaction, and cloud interaction. Wearable devices will bring about big changes in our lives and perceptions. Most wearable devices exist in the form of portable accessories that have some computing functions and can be connected to mobile phones and various types of terminals. Mainstream product forms include watch classes supported by wrists, shoe classes supported by feet, and Glass classes supported by heads.

With the development of mobile terminal equipment and wearable device technology, unlocking technology of mobile terminal devices continuously develops and progresses, and unlocking methods also emerges endlessly; however, there are problems with security and convenience of current unlocking methods.

SUMMARY

In view of this, a technical problem mainly solved by the present disclosure is to provide an unlocking method for a mobile terminal device, a mobile terminal device, and an unlocking system for a mobile terminal device, which can improve convenience of unlocking a mobile terminal device.

In order to solve the above technical problem, one technical solution adopted by the present disclosure is to provide an unlocking method for a mobile terminal device, wherein the unlocking method comprises: collecting first unlocking information using a first sensing apparatus on a mobile terminal device, wherein the first unlocking information is physiological state feature information of a human body; and comparing the first unlocking information with first preset unlocking information, and if the first unlocking information matches the first preset unlocking information, unlocking mobile terminal device.

In order to solve the above technical problem, another technical solution adopted by the present disclosure is to provide a mobile terminal device, wherein, the mobile terminal device comprises a first sensing apparatus, the first sensing apparatus is disposed at a holding portion of the mobile terminal device and configured to collect first unlocking information, the first unlocking information is physiological state feature information of a human body, and is transmitted to the first sensing apparatus through the human body and used to compare the first unlocking information with first preset unlocking information; if the first unlocking information matches the first preset unlocking information, the mobile terminal device is unlocked.

In order to solve the above technical problem, another technical solution adopted by the present disclosure is to provide an unlocking system for a mobile terminal device, wherein, the unlocking system comprises a mobile terminal device and a wearable mobile device; the mobile terminal device comprises a first sensing apparatus, the first sensing apparatus is disposed at a holding portion of the mobile terminal device and configured to collect first unlocking information; wherein, the first unlocking information is physiological state feature information of a human body, and is transmitted to the first sensing apparatus through the human body and used to compare the first unlocking information with first preset unlocking information; if the first unlocking information matches the first preset unlocking information, the mobile terminal device is unlocked; the wearable mobile device comprises a second sensing apparatus, the wearable mobile device stores second unlocking information, and the second sensing apparatus is in contact with the human body to transmit the second unlocking information through the human body to the mobile terminal device and thereby unlock the mobile terminal device.

The mobile terminal device can implement the following unlocking method: collecting first unlocking information using a first sensing device of the mobile terminal apparatus, wherein the first unlocking information is physiological state feature information of the human body; wherein, the physiological state feature information includes a blood pressure, a heart rate, and a human body impedance; comparing the first unlocking information with the first preset unlocking information, and if the first unlocking information matches the first preset unlocking information, unlocking the mobile terminal device. The unlocking method further comprises: setting a second sensing apparatus in a wearable mobile device, wherein the second sensing apparatus can be in contact with a human body and perform signal transmission; transmitting second unlocking information stored in the wearable mobile device through the human body as a transmission medium to the first sensing apparatus; comparing the second unlock information with second preset unlocking information, if the first unlocking information matches the first preset unlocking information and the second unlocking information matches the second preset unlocking information, unlocking the mobile terminal device.

Beneficial effect of the present disclosure is that: compared with the prior art, in which a portable device collects response information according to an unlocking request of a smart handheld device so as to perform an operation of unlocking the smart handheld device, the present disclosure uses a first sensing apparatus in a mobile terminal device to collect physiological state feature information, which is compared with first preset unlocking information to unlock the mobile terminal device. It is not necessary to collect unlocking information through a portable device, and thus convenience of unlocking the mobile terminal device can be improved.

DETAILED DESCRIPTION

Technical solutions in embodiments of the present disclosure will be clearly and completely described below in accompany with drawings of the embodiments of the present disclosure.

Figure 1:
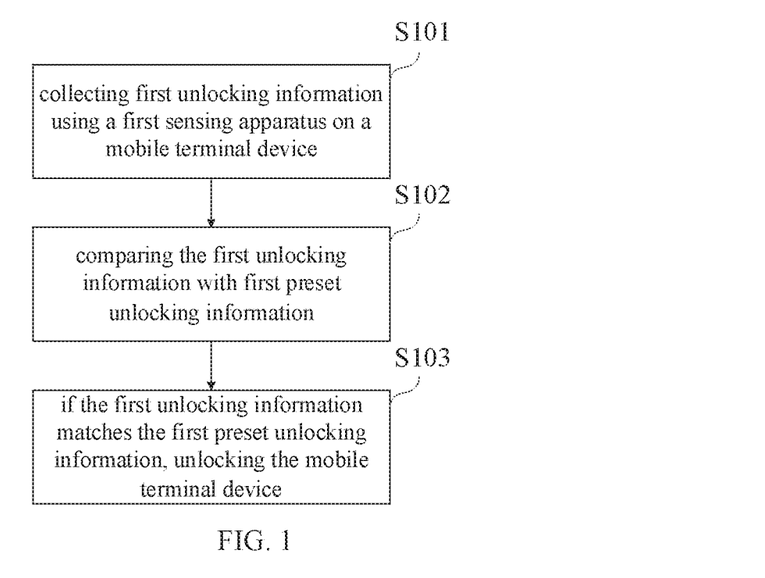
FIG. 1 is a schematic flow chart of a first embodiment of an unlocking method for a mobile terminal device of the present disclosure.

Referring to FIG. 1, FIG. 1 is a schematic flow chart of a first embodiment of an unlocking method for a mobile terminal device of the present disclosure.

S101: collecting first unlocking information using a first sensing apparatus on a mobile terminal device.

In this embodiment, the mobile terminal device may be a mobile terminal device having computing processing capability, such as a mobile phone, a notebook computer, a tablet computer, a POS machine, or the like, which can implement an unlocking method described in this embodiment, and is not limited herein.

In this embodiment, the first unlocking information may be physiological state feature information of a human body, that is, physiological state feature information which can represent unique identity of each person. The first sensing apparatus in the mobile terminal device collects the physiological state feature information as unlocking information, which can ensure security of the unlocking information to a great extent. In addition, no additional memory is needed, and thus the convenience of unlocking the mobile terminal device can be improved.

The physiological state feature information is different from other physiological information, such as fingerprints, voiceprints, etc. Physiological information such as fingerprints, voiceprints, and the like can be saved through third-party media, and mobile terminal devices can be unlocked through third-party media, for example, fingerprint information extracted through a film, and the film with the fingerprint information is in contact with the first sensing apparatus of the mobile terminal device, an unlocking operation can also be achieved. However, for the physiological state feature information, only when a person oneself who matches preset unlocking information is in contact with the first sensing apparatus, the first sensing apparatus can collect unlocking information that matches the preset unlocking information.

S102: comparing the first unlocking information with first preset unlocking information.

In this embodiment, the first preset unlocking information is stored in the mobile terminal device and configured to unlock the mobile terminal device. After the first sensing apparatus in the mobile terminal device collects the first unlocking information, the first unlocking information is compared with the first preset unlocking information stored in the mobile terminal device.

S103: if the first unlocking information matches the first preset unlocking information, unlocking the mobile terminal device.

In this embodiment, that the first unlocking information matches the first preset unlocking information means that the first unlocking information is identical to the first preset unlocking information. For example, if the first preset unlocking information is a body impedance value, and the first unlocking information is the same body impedance value, the two match each other; alternatively, if the first preset unlocking information is a combination of a heart rate and a body impedance, and the first, unlocking information is the same combination of a heart rate and a body impedance, the two can match each other. If the first unlocking information matches the first preset unlocking information, the mobile terminal device is unlocked, and a user can perform further operations on the mobile terminal device.

Of course, as understood by those skilled in the art, a human body can carry unlocking information for unlocking the mobile terminal device, such as a chip carrying the unlocking information or the like. By using the chip to contact the human body, the unlocking information can be transmitted to the mobile terminal device through the human body, thereby unlocking the mobile terminal.

Figure 2:
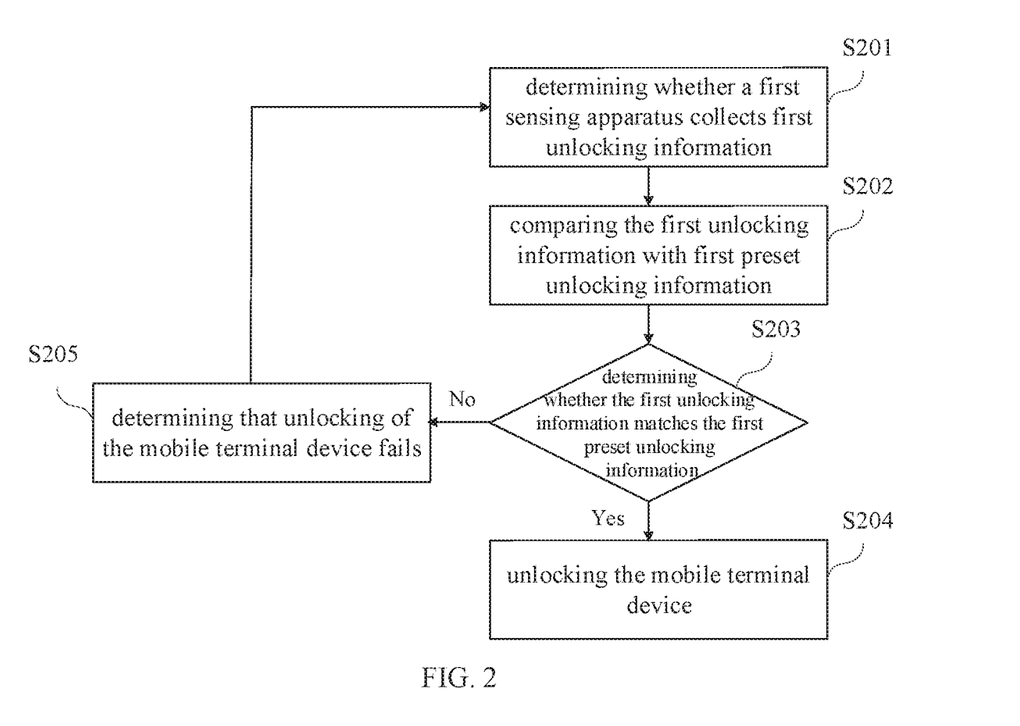
FIG. 2 is a schematic flow chart of a second embodiment of an unlocking method for a mobile terminal device of the present disclosure.

Referring to FIG. 2, FIG. 2 is a schematic flow chart of a second embodiment of an unlocking method for a mobile terminal device of the present disclosure.

S201: determining whether a first sensing apparatus collects first unlocking information.

In this embodiment, the first unlocking information is collected using the first sensing apparatus in the mobile terminal device. If the first unlocking information is collected, a step S202 is executed; if the first unlocking information is not collected, the step S201 is continued to be executed.

In this embodiment, the first unlocking information may be physiological state feature information of a human body, that is, physiological state feature information which can represent unique identity of each person. Optionally, the first unlocking information can be a blood pressure, a heart rate, a body impedance, and so on; of course, the first unlocking information can also be a combination of many, for example, a blood pressure and a body impedance, a heart rate and a body impedance, or the like can be used as the first unlocking information in the form of combinations, which is not limited herein.

Optionally, compositions and contents of various elements in human bodies are different, so that an impedance of a human body of each person also varies. When applying a voltage to a human body, wherein a magnitude of the voltage is within the voltage value that a human body can withstand to ensure that human health is not harmed, due to different impedances of human bodies, current generated by the applied voltage is different, so that identity differentiation is achieved. Using the human body impedance as the unlocking information can ensure security of the unlocking information to a great extent. In addition, no additional memory is needed, and thus the convenience of unlocking the mobile terminal device can be improved. The advantages of using physiological state feature information of human bodies as the unlocking information are described above by taking only the human body impedance as an example, and other physiological state feature information also has the advantages of the human body impedance.

The physiological state feature information is different from other physiological information, such as fingerprints, voiceprints, etc. Physiological information such as fingerprints, voiceprints, and the like can be saved through third-party media, and mobile terminal devices can be unlocked through third-party media, for example, fingerprint information is extracted through a film, and the film with the fingerprint information is in contact with the first sensing apparatus of the mobile terminal device, an unlocking operation can also be achieved. However, for the physiological state feature information, only when a person oneself who matches preset unlocking information is in contact with the first sensing apparatus, the first sensing apparatus can collect unlocking information that matches the preset unlocking information.

S202: comparing the first unlocking information with first preset unlocking information.

In this embodiment, the first preset unlocking information is stored in the mobile terminal device and configured to unlock the mobile terminal device. After the first sensing apparatus in the mobile terminal device collects the first unlocking information, the first unlocking information is compared with the first preset unlocking information stored in the mobile terminal device.

Optionally, the first preset unlocking information can be physiological state feature information corresponding to the first unlocking information or a combination of many, for example, a blood pressure and a body impedance, a heart rate and a body impedance, or the like can be used as the first unlocking information n the form of combinations, which is not limited herein.

Of course, as understood by those skilled in the art, a human body can carry unlocking information for unlocking the mobile terminal device, such as a chip carrying the unlocking information or the like. By using the chip to contact the human body, the unlocking information can be transmitted to the mobile terminal device through the human body, thereby unlocking the mobile terminal.

S203: determining whether the first unlocking information matches the first preset unlocking information.

In this embodiment, if the first unlocking information matches the first preset unlocking information, a step S204 is executed; if the first unlocking information does not match the first preset unlocking information, a step S205 is executed. That the first unlocking information matches the first preset unlocking information means that the first unlocking information is identical to the first preset unlocking information. For example, if the first preset unlocking information is a body impedance value, and the first unlocking information is the same body impedance value, the two match each other; alternatively, if the first preset unlocking information is a combination of a heart rate and a body impedance, and the first unlocking information is the same combination of a heart rate and a body impedance, the two can match each other.

S204, unlocking the mobile terminal device.

In this embodiment, if the first unlocking information matches the first preset unlocking information, the mobile terminal device is unlocked, and a user can perform further operations, for example, office, communication, entertainment, and so on, on the mobile terminal device.

S205: determining that unlocking of the mobile terminal device fails.

In this embodiment, if the first unlocking information does not match the first preset unlocking information, unlocking of the mobile terminal device fails, the step S201 is continued to be executed, and the user cannot perform further operations, for example, office, communication, entertainment, and so on, on the mobile terminal device.

As can be seen from the above, the present disclosure uses a first sensing apparatus in a mobile terminal device to collect physiological state feature information, which is compared with first preset unlocking information to unlock the mobile terminal device. It is not necessary to collect unlocking information through a portable device, and thus convenience of unlocking the mobile terminal device can be improved.

Figure 3:
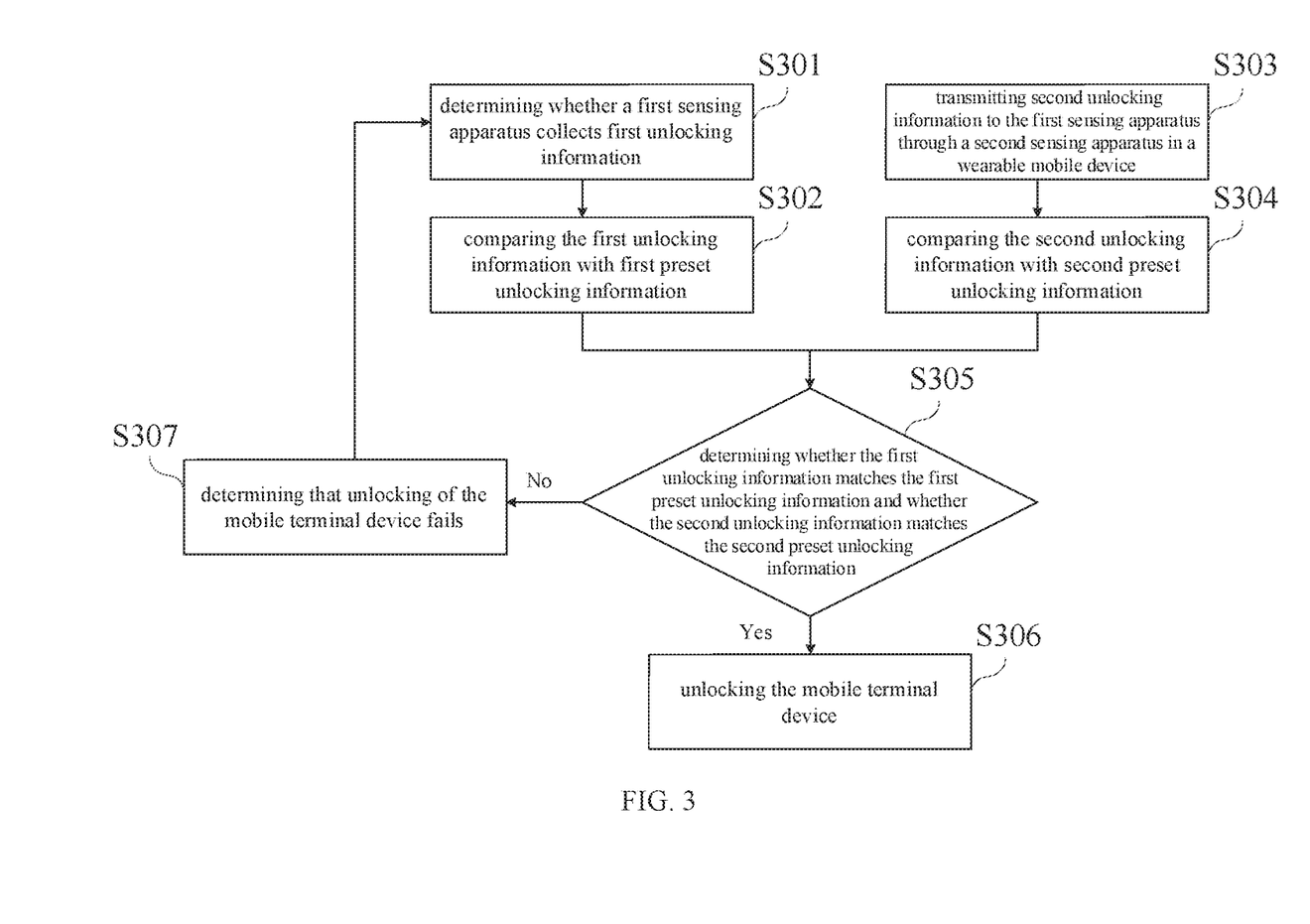
FIG. 3 is a schematic flow chart of a third embodiment of an unlocking method for a mobile terminal device of the present disclosure.

Referring to FIG. 3, FIG. 3 is a schematic flow chart of a third embodiment of an unlocking method for a mobile terminal device of the present disclosure.

S301: determining whether a first sensing apparatus collects first unlocking information.

In this embodiment, unlocking information is collected using the first sensing apparatus in the mobile terminal device. If collected information is the first unlocking information, a step S302 is executed; if no unlocking information is collected, the step S301 is continued to be executed.

S302: comparing the first unlocking information with first preset unlocking information.

In this embodiment, the first unlocking information may be physiological state feature information of a human body, that is, physiological state feature information which can represent unique identity of each person. Optionally, the first unlocking information can be a blood pressure, a heart rate, a body impedance, and so on; of course, the first unlocking information can also be a combination of many, for example, a blood pressure and a body impedance, a heart rate and a body impedance, or the like can be used as the first unlocking information in the form of combinations, which is not limited herein.

Optionally, compositions and contents of various elements in human bodies are different, so that an impedance of a human body of each person also varies. When applying a voltage to a human body, wherein a magnitude of the voltage is within the voltage value that a human body can withstand to ensure that human health is not harmed, due to different impedances of human bodies, current generated by the applied voltage is different, so that identity differentiation is achieved. Using the human body impedance as the unlocking information can ensure security of the unlocking information to a great extent. In addition, no additional memory is needed, and thus the convenience of unlocking the mobile terminal device can be improved. The advantages of using physiological state feature information of human bodies as the unlocking information are described above by taking only the human body impedance as an example, and other physiological state feature information also has the advantages of the human body impedance.

The physiological state feature information is different from other physiological information, such as fingerprints, voiceprints, etc. Physiological information such as fingerprints, voiceprints, and the like can be saved through third-party media, and mobile terminal devices can be unlocked through third-party media, for example, fingerprint information is extracted through a film, and the film with the fingerprint information is in contact with the first sensing apparatus of the mobile terminal device, an unlocking operation can also be achieved. However, for the physiological state feature information, only when a person oneself who matches preset unlocking information is in contact with the first sensing apparatus, the first sensing apparatus can collect unlocking information that matches the preset unlocking information.

In this embodiment, the first preset unlocking information is stored in the mobile terminal device and configured to unlock the mobile terminal device. After the first sensing apparatus in the mobile terminal device collects the first unlocking information, the first unlocking information is compared with the first preset unlocking information stored in the mobile terminal device.

Optionally, the first preset unlocking information can be physiological state feature information corresponding to the first unlocking information or a combination of many, for example, a blood pressure and a body impedance, a heart rate and a body impedance, or the like can be used as the first unlocking information in the form of combinations, which is not limited herein.

S303: transmitting second unlocking information to the first sensing apparatus through a second sensing apparatus in a wearable mobile device.

In this embodiment, the second sensing apparatus in the wearable mobile device can be in contact with a human body and performs signal transmission in the human body. The wearable mobile device stores the second unlocking information, and the wearable mobile device transmits the second unlocking information to the human body through the second sensing apparatus and further to the first sensing apparatus through the human body used as a transmission medium to unlock the mobile terminal device.

Optionally, the wearable mobile device may be in the form of a convenient product, such as a wristband, a watch, a headband, and so on, which has a computing processing function, and can realize the above-mentioned function of transmitting the stored second unlocking information to the mobile terminal device through the human body for unlocking the mobile terminal device. All the products can be the wearable mobile device described in this embodiment, and are not limited herein.

Optionally, when multiple wearable mobile devices are worn on a body of a user, the user may select to receive the second unlocking information from a certain wearable mobile device on the mobile terminal device. Of course, as understood by those skilled in the art, the user can select to receive unlocking information transmitted by multiple wearable mobile devices, and only needs to store corresponding preset unlocking information in the mobile terminal device, so as to cooperate with the first unlocking information and thereby unlock the mobile terminal device.

S304: comparing the second unlocking information with second preset unlocking information.

In this embodiment, the second unlocking information can be the same physiological state feature information as the first unlocking information, and the second preset unlocking information can also be the same corresponding physiological state feature information as the first unlocking information, they are not repeated herein. In one alternative, the wearable mobile device stores set unlock information, such as a string of codes, a set of serial numbers, characters, and so on, as the second unlock information. In another alternative, a chip carrying the unlock information is implanted in the wearable mobile device, and the unlocking information in the chip is used as the second unlocking information, which is transmitted to the mobile terminal device for an unlocking operation by the wearable mobile device being in contact with the human body. It should be noted that the second unlocking information may include, but is not limited to, the unlocking information forms described above.

S305: determining whether the first unlocking information matches the first preset unlocking information and whether the second unlocking information matches the second preset unlocking information.

In this embodiment, if the first unlocking information matches the first preset unlocking information and the second unlocking information matches the second preset unlocking information, a step S306 is executed; if the first unlocking information does not match the first preset unlocking information and/or the second unlocking information does not match the second preset unlocking information, a step S307 is executed. That the unlocking information matches the preset unlocking information means that the unlocking information is identical to the preset unlocking information. For example, if the preset unlocking information is a body impedance value, and the unlocking information is the same body impedance value, the two match each other; alternatively, if the preset unlocking information is a combination of a heart rate and a body impedance, and the unlocking information is the same combination of a heart rate and a body impedance, the two can match each other.

S306, unlocking the mobile terminal device.

In this embodiment, if the first unlocking information matches the first preset unlocking information and the second unlocking information matches the second preset unlocking information, the mobile terminal device is unlocked, and a user can perform further operations, for example, office, communication, entertainment, and so on, on the mobile terminal device.

S307: determining that unlocking of the mobile terminal device fails.

In this embodiment, if the first unlocking information does not match the first preset unlocking information and/or the second unlocking information does not match the second preset unlocking information, unlocking of the mobile terminal device fails, the step S301 is continued to be executed, and the user cannot perform further operations, for example, office, communication, entertainment, and so on, on the mobile terminal device.

As can be seen from the above, the present disclosure uses a first sensing apparatus in a mobile terminal device to collect the first and second unlocking information, which is compared with first and second preset unlocking information; by the cooperation between the mobile terminal device and the wearable mobile device, the mobile terminal device is unlocked, so that safety of unlocking the mobile terminal device can be improved.

Figure 4:
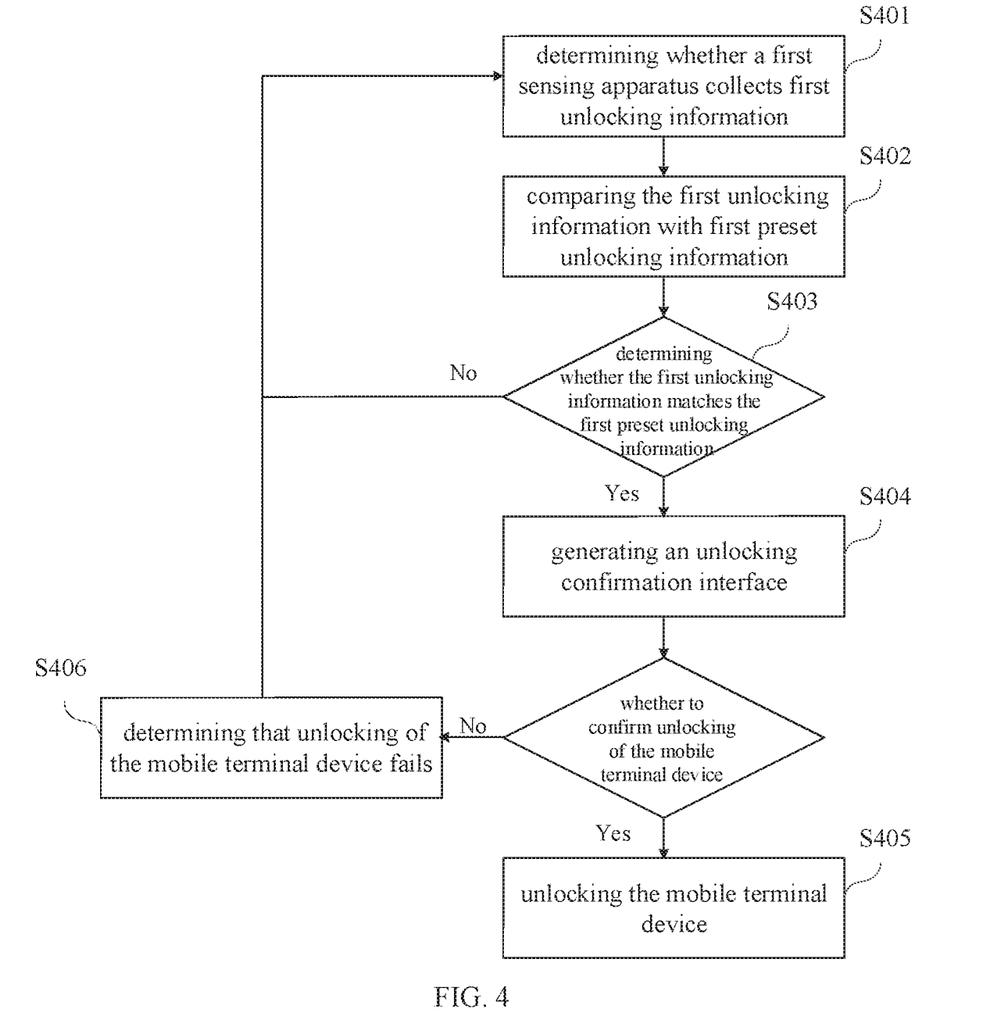
FIG. 4 is a schematic flow chart of a fourth embodiment of an unlocking method for a mobile terminal device of the present disclosure.
Figure 5:
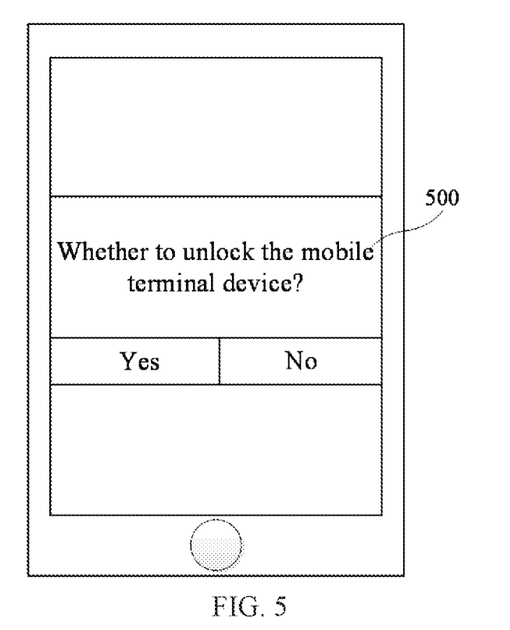
FIG. 5 is a structural schematic view of an embodiment of an unlocking confirmation interface of the present disclosure.
Figure 6:
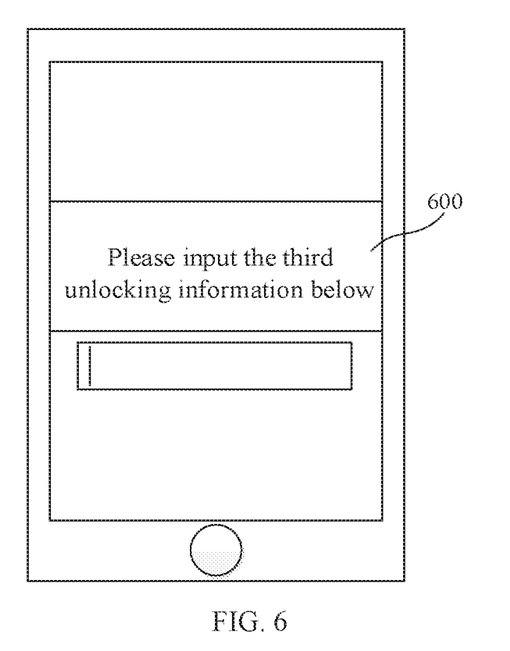
FIG. 6 is a structural schematic view of another embodiment of an unlocking confirmation interface of the present disclosure.

Referring to FIGS. 4-6, FIG. 4 is a schematic flow chart of a fourth embodiment of an unlocking method for a mobile terminal device of the present disclosure. FIG. 5 is a structural schematic view of an embodiment of an unlocking confirmation interface of the present disclosure. FIG. 6 is a structural schematic view of another embodiment of an unlocking confirmation interface of the present disclosure.

S401: determining whether a first sensing apparatus collects first unlocking information.

In this embodiment, unlocking information is collected using the first sensing apparatus in the mobile terminal device. If the first unlocking information is collected, a step 402 is executed; if the first unlocking information is not collected, the step S401 is continued to be executed.

S402: comparing the first unlocking information with first preset unlocking information.

In this embodiment, the first unlocking information may be physiological state feature information of a human body, that is, physiological state feature information which can represent unique identity of each person. Optionally, the first unlocking information can be a blood pressure, a heart rate, a body impedance, and so on; of course, the first unlocking information can also be a combination of many, for example, a blood pressure and a body impedance, a heart rate and a body impedance, or the like can be used as the first unlocking information in the form of combinations, which is not limited herein.

Optionally, compositions and contents of various elements in human bodies are different, so that an impedance of a human body of each person also varies. When applying a voltage to a human body, wherein a magnitude of the voltage is within the voltage value that a human body can withstand to ensure that human health is not harmed, due to different impedances of human bodies, current generated by the applied voltage is different, so that identity differentiation is achieved. Using the human body impedance as the unlocking information can ensure security of the unlocking information to a great extent. In addition, no additional memory is needed, and thus the convenience of unlocking the mobile terminal device can be improved. The advantages of using physiological state feature information of human bodies as the unlocking information are described above by taking only the human body impedance as an example, and other physiological state feature information also has the advantages of the human body impedance.

The physiological state feature information is different from other physiological information, such as fingerprints, voiceprints, etc. Physiological information such as fingerprints, voiceprints, and the like can be saved through third-party media, and mobile terminal devices can be unlocked through third-party media, for example, fingerprint information is extracted through a film, and the film with the fingerprint information is in contact with the first sensing apparatus of the mobile terminal device, an unlocking operation can also be achieved. However, for the physiological state feature information, only when a person oneself who matches preset unlocking information is in contact with the first sensing apparatus, the first sensing apparatus can collect unlocking information that matches the preset unlocking information.

In this embodiment, the first preset unlocking information is stored in the mobile terminal device and configured to unlock the mobile terminal device. After the first sensing apparatus in the mobile terminal device collects the first unlocking information, the first unlocking information is compared with the first preset unlocking information stored in the mobile terminal device.

Optionally, the first preset unlocking information can be physiological state feature information corresponding to the first unlocking information or a combination of many, for example, a blood pressure and a body impedance, a heart rate and a body impedance, or the like can be used as the first unlocking information in the form of combinations, which is not limited herein.

S403: determining whether the first unlocking information matches the first preset unlocking information.

In this embodiment, if the first unlocking information matches the first preset unlocking information, a step S404 is executed; if the first unlocking information does not match the first preset unlocking information, a step S406 is executed. That the unlocking information matches the preset unlocking information means that the unlocking information is identical to the preset unlocking information. For example, if the preset unlocking information is a body impedance value, and the unlocking information is the same body impedance value, the two match each other; alternatively, if the preset unlocking information is a combination of a heart rate and a body impedance, and the unlocking information is the same combination of a heart rate and a body impedance, the two can match each other.

S404: generating an unlocking confirmation interface.

In this embodiment, if the first unlocking information matches the first preset unlocking information and the second unlocking information matches the second preset unlocking information, an unlocking confirmation interface is generated in the mobile terminal device, and the operation of unlocking the mobile terminal device is confirmed the second time through the unlocking confirmation interface; if unlocking of the mobile terminal device is confirmed, a step S405 is executed; if unlocking of the mobile terminal device is canceled, a step S406 is executed.

Optionally, an unlocking confirmation interface 500 can allow a user to select "Yes" or "No" and thereby perform the second confirmation for an operation of unlocking the mobile terminal device, as shown in FIG. 5; alternatively, an unlocking confirmation interface 600 can allow a user to input third unlocking information, and when the third unlocking information matches third preset unlocking information successfully, the mobile terminal device is then unlocked, as shown in FIG. 6. The third unlocking information and the third preset unlocking information adopt the same unlocking information forms as the first unlocking information, the first preset unlocking information, the second unlocking information, and the second preset unlocking information described in the above embodiments, and thus is not repeated herein. Of course, in order to further improve safety performance of the unlocking information, unlocking information forms of the third unlocking information and the third preset unlocking information can also adopt unlocking information forms being different from that of the first unlocking information, the first preset unlocking information, the second unlocking information, and the second preset unlocking information described in the above embodiments, which are not limited herein.

Optionally, after generating the unlocking confirmation interface, if the user does not perform relating operations on the unlocking confirmation interface within a first preset time, the unlocking confirmation interface is closed, and the mobile terminal device continues to keep a locking state.

Optionally, the first preset time can be 1 minute, 5 minute, 10 minute, and so on. It is set according to requirements of users, and is not limited herein.

S405: unlocking the mobile terminal device.

In this embodiment, after the mobile terminal device is unlocked, a user can perform further operations, for example, office, communication, entertainment, and so on, on the mobile terminal device.

S406: determining that unlocking of the mobile terminal device fails.

In this embodiment, when unlocking of the mobile terminal device fails, the step 401 is continued to be executed, and the user cannot perform further operations, for example, office, communication, entertainment, and so on, on the mobile terminal device.

Figure 7:
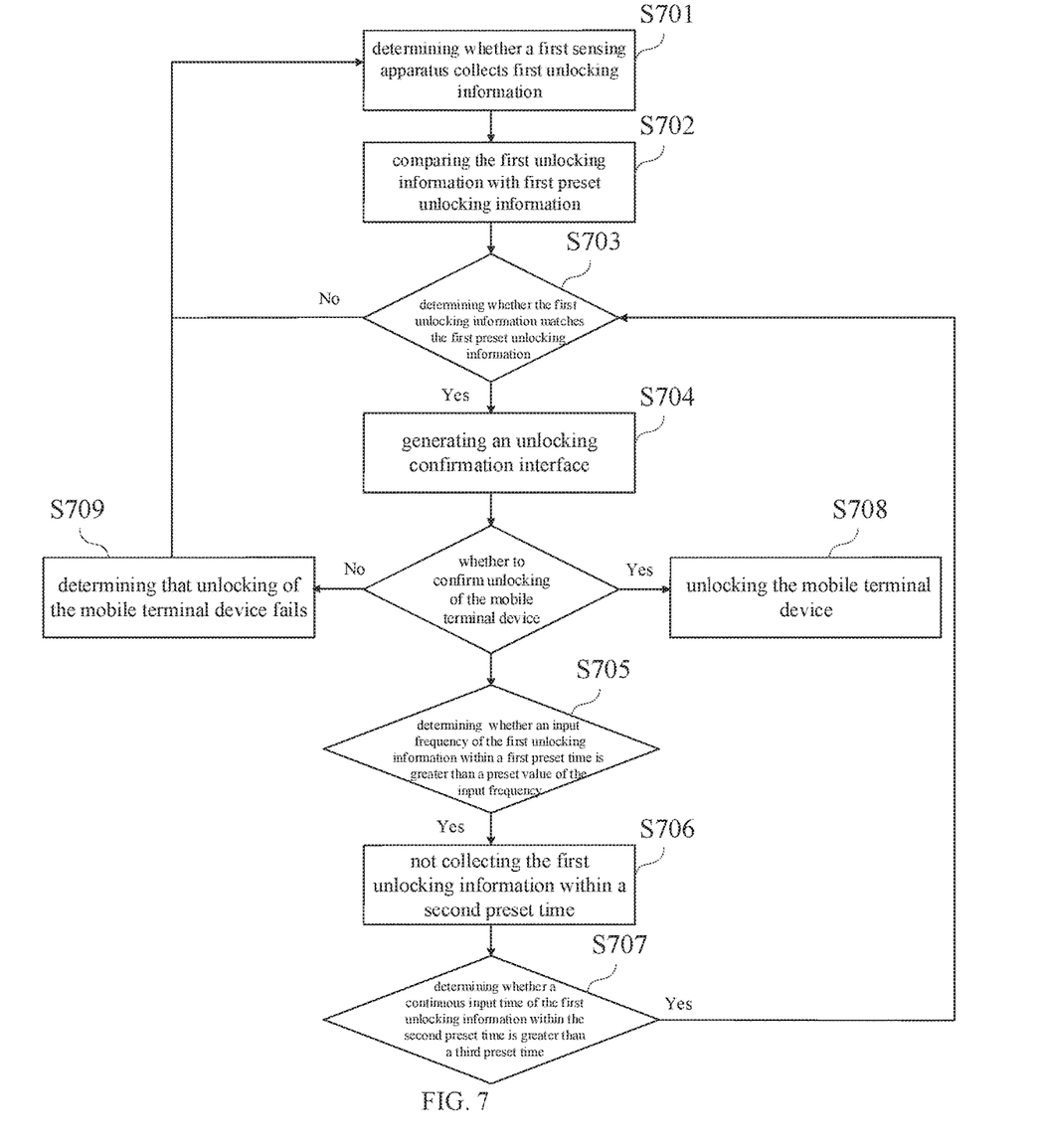
FIG. 7 is a schematic flow chart of a fifth embodiment of an unlocking method for a mobile terminal device of the present disclosure.

Referring to FIG. 7, FIG. 7 is a schematic flow chart of a fifth embodiment of an unlocking method for a mobile terminal device of the present disclosure.

S701: determining whether a first sensing apparatus collects first unlocking information.

In this embodiment, unlocking information is collected using the first sensing apparatus in the mobile terminal device. If the first unlocking information is collected, a step 702 is executed; if the first unlocking information is not collected, the step 701 is continued to be executed.

S702: comparing the first unlocking information with first preset unlocking information.

In this embodiment, the first unlocking information may be physiological state feature information of a human body, that is, physiological state feature information which can represent unique identity of each person. Optionally, the first unlocking information can be a blood pressure, a heart rate, a body impedance, and so on; of course, the first unlocking information can also be a combination of many, for example, a blood pressure and a body impedance, a heart rate and a body impedance, or the like can be used as the first unlocking information in the form of combinations, which is not limited herein.

Optionally, compositions and contents of various elements in human bodies are different, so that an impedance of a human body of each person also varies. When applying a voltage to a human body, wherein a magnitude of the voltage is within the voltage value that a human body can withstand to ensure that human health is not harmed, due to different impedances of human bodies, current generated by the applied voltage is different, so that identity differentiation is achieved. Using the human body impedance as the unlocking information can ensure security of the unlocking information to a great extent. In addition, no additional memory is needed, and thus the convenience of unlocking the mobile terminal device can be improved. The advantages of using physiological state feature information of human bodies as the unlocking information are described above by taking only the human body impedance as an example, and other physiological state feature information also has the advantages of the human body impedance.

The physiological state feature information is different from other physiological information, such as fingerprints, voiceprints, etc. Physiological information such as fingerprints, voiceprints, and the like can be saved through third-party media, and mobile terminal devices can be unlocked through third-party media, for example, fingerprint information is extracted through a film, and the film with the fingerprint information is in contact with the first sensing apparatus of the mobile terminal device, an unlocking operation can also be achieved. However, for the physiological state feature information, only when a person oneself who matches preset unlocking information is in contact with the first sensing apparatus, the first sensing apparatus can collect unlocking information that matches the preset unlocking information.

In this embodiment, the first preset unlocking information is stored in the mobile terminal device and configured to unlock the mobile terminal device. After the first sensing apparatus in the mobile terminal device collects the first unlocking information, the first unlocking information is compared with the first preset unlocking information stored in the mobile terminal device.

Optionally, the first preset unlocking information can be physiological state feature information corresponding to the first unlocking information or a combination of many, for example, a blood pressure and a body impedance, a heart rate and a body impedance, or the like can be used as the first unlocking information in the form of combinations, which is not limited herein.

S703: determining whether the first unlocking information matches the first preset unlocking information.

In this embodiment, if the first unlocking information matches the first preset unlocking information, a step S704 is executed; if the first unlocking information does not match the first preset unlocking information, a step S709 is executed. That the unlocking information matches the preset unlocking information means that the first unlocking information is identical to the first preset unlocking information. For example, if the first preset unlocking information is a body impedance value, and the first unlocking information is the same body impedance value, the two match each other; alternatively, if the first preset unlocking information is a combination of a heart rate and a body impedance, and the first unlocking information is the same combination of a heart rate and a body impedance, the two can match each other.

S704: generating an unlocking confirmation interface.

In this embodiment, if the first unlocking information matches the first preset unlocking information, an unlocking confirmation interface is generated in the mobile terminal device, and the operation of unlocking the mobile terminal device is confirmed the second time through the unlocking confirmation interface; if unlocking of the mobile terminal device is confirmed, a step S708 is executed; if unlocking of the mobile terminal device is canceled, a step S709 is executed.

Optionally, after generating the unlocking confirmation interface, if the user does not perform relating operations on the unlocking confirmation interface within a first preset time, the unlocking confirmation interface is closed, and the mobile terminal device continues to keep a locking state.

Optionally, the first preset time can be 1 minute, 5 minute, 10 minute, and so on. It is set according to requirements of users, and is not limited herein.

S705: determining whether an input frequency of the first unlocking information within a first preset time is greater than a preset value of the input frequency.

In this embodiment, if the input frequency of the first unlocking information within the first preset time is greater than the preset value of the input frequency, a step S706 is executed; optionally, the preset value of the input frequency can be 5 times per minute, 10 times per minute, and so on; it is set according to requirements of users, and is not limited herein.

Optionally, if the input frequency of the first unlocking information within the first preset time is not greater than the preset value of the input frequency, the unlocking confirmation interface is closed, and the mobile terminal device continues to keep a locking state.

S706: not collecting the first unlocking information within a second preset time.

In this embodiment, if the input frequency of the first unlocking information within the first preset time is greater than the preset value of the input frequency, the first unlocking information is not collected within the second preset time. It can be prevented that a user touches the first sensing apparatus by mistake and causes the unlocking confirmation interface to be generated many times, which brings inconvenience to a use process of the user, and that endurance capacity of the mobile terminal device becomes worse at the same time because of lighting a screen of the mobile terminal many times.

Optionally, if the input frequency of the first unlocking information within the first preset time is not greater than the preset value of the input frequency, the unlocking confirmation interface is closed, and the mobile terminal device continues to keep a locking state.

Optionally, the second preset time can be 1 minute, 5 minute, 10 minute, and so on. It is set according to requirements of users, and is not limited herein.

S707: determining whether a continuous input time of the first unlocking information within the second preset time is greater than a third preset time.

In this embodiment, in the second preset time, the first sensing apparatus does not collect the first unlocking information. It is inevitable that a user wants to unlock the mobile terminal device after touching the first sensing apparatus by mistake and thus resulting in that the first sensing apparatus does not collect the first unlocking information, but the user cannot unlock the mobile terminal device because the first sensing apparatus does not collect the first unlocking information. In order to avoid the above situation, in this embodiment, a user can continuously touch the first sensing apparatus, that is, touch the first sensing apparatus without releasing, so as to achieve effect of continuously inputting the first unlocking information. If the continuous input time of the first unlocking information within the second preset time is greater than the third preset time, the first unlocking information is collected, and the step S703 is executed.

Optionally, the third preset time can be 1 minute, 5 minute, 10 minute, and so on. It is set according to requirements of users, and is not limited herein.

S708: unlocking the mobile terminal device.

In this embodiment, after the mobile terminal device is unlocked, a user can perform further operations, for example, office, communication, entertainment, and so on, on the mobile terminal device.

S709: determining that unlocking of the mobile terminal device fails.

In this embodiment, when unlocking of the mobile terminal device fails, the step 701 is continued to be executed, and the user cannot perform further operations, for example, office, communication, entertainment, and so on, on the mobile terminal device.

In conclusion, the present disclosure uses a first sensing apparatus in a mobile terminal device to collect physiological state feature information, which is compared with first preset unlocking information to unlock the mobile terminal device. It is not necessary to collect unlocking information through a portable device, and thus convenience of unlocking the mobile terminal device can be improved. Moreover, by generating the unlocking confirmation interface on the mobile terminal device, it is prevented that the mobile terminal device is unlocked by mistake and leads to disclosure of personal privacy in public, so that safety of unlocking the mobile terminal device is improved.

Figure 8:
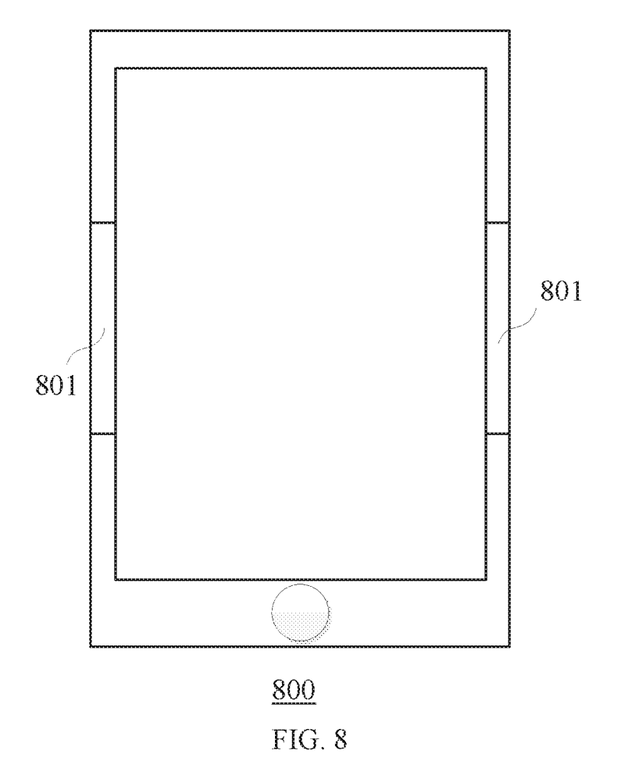
FIG. 8 is a structural schematic view of an embodiment of a mobile terminal device of the present disclosure.

Referring to FIG. 8, FIG. 8 is a structural schematic view of an embodiment of a mobile terminal device of the present disclosure.

In this embodiment, the mobile terminal device 800 comprises a first sensing apparatus 801, the first sensing apparatus 801 is disposed at a holding portion of the mobile terminal device 800 and configured to collect first unlocking information; the first unlocking information is physiological state feature information of a human body, and is transmitted to the first sensing apparatus 801 through the human body and used to compare the first unlocking information with first preset unlocking information; if the first unlocking information matches the first preset unlocking information, the mobile terminal device 800 is unlocked.

Figure 9:
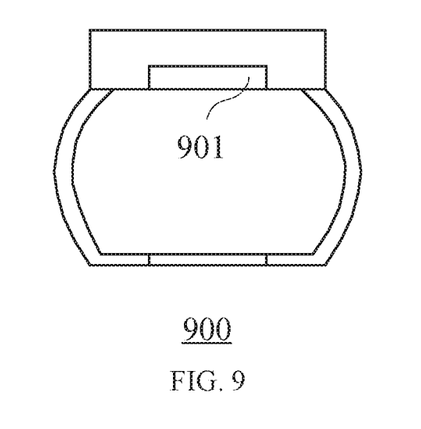
FIG. 9 is a structural schematic view of an embodiment of a wearable mobile device of the present disclosure.

Referring to FIG. 9, FIG. 9 is a structural schematic view of an embodiment of a wearable mobile device of the present disclosure.

In this embodiment, the wearable mobile device 900 comprises a second sensing apparatus 901, the wearable mobile device 900 stores second unlocking information, and the second sensing apparatus 901 is in contact with a human body to transmit the second unlocking information to a mobile terminal device through the human body and thereby unlocking the mobile terminal device. In this embodiment, the wearable mobile device 900 takes an intelligent watch as an example to be described in detail, but this does not limit the wearable mobile device 900 in this embodiment. The second sensing apparatus 901 is disposed at a side of a main body of the wearable mobile device 900 being in contact with the human body, and is configured to transmit the second unlocking information to the mobile terminal device through the human body and thereby unlock the mobile terminal device.

Figure 10:
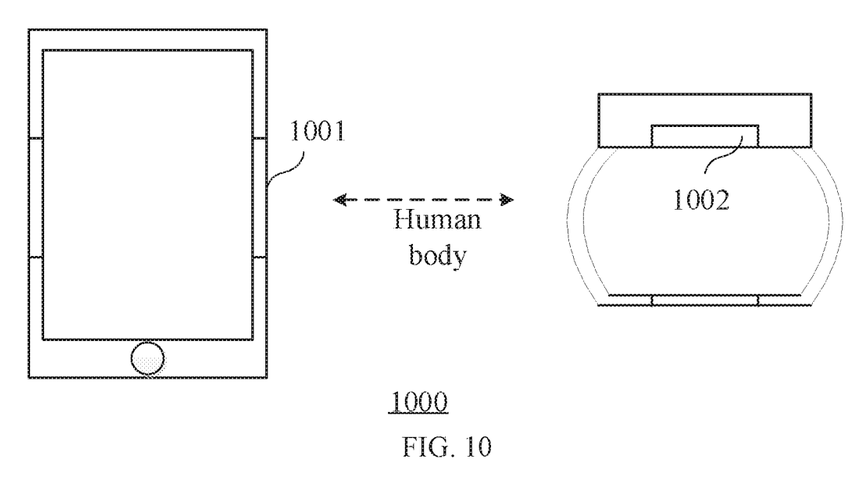
FIG. 10 is a schematic flow chart of an embodiment of an unlocking system for a mobile terminal device of the present disclosure.

FIG. 10 is a schematic flow chart of an embodiment of an unlocking system for a mobile terminal device of the present disclosure.

In this embodiment, the unlocking system 1000 comprises a mobile terminal device 1001 and a wearable mobile device 1002. The mobile terminal device 1001 is a mobile terminal device described in the above embodiments, and is not repeated herein. The wearable mobile device 1002 is a wearable mobile device described in the above embodiments, and is not repeated herein. The unlocking system 1000, using the mobile terminal device 1001 and the wearable mobile device 1002, can achieve an unlocking method for a mobile terminal device described in the above embodiments, and is not repeated herein.

In conclusion, the present disclosure uses a first sensing apparatus in a mobile terminal device to collect first and second unlocking information, which is compared with first and second preset unlocking information to unlock the mobile terminal device, so that safety of unlocking the mobile terminal device can be improved. Moreover, by generating an unlocking confirmation interface, it can be prevented that a user unlocks the mobile terminal device by mistake, and disclosure of private information is avoided.

The above are merely embodiments of the present disclosure and are not intended to limit the patent scope of the present disclosure. Any equivalent structure or equivalent process transformation made with content of the specification and drawings of the present disclosure, or direct or indirect use in other relating technical fields, are all similarly included in the patent protection scope of the present disclosure.

What is claimed is:

1. An unlocking system for a mobile terminal device, wherein, the unlocking system comprises a mobile terminal device;

the mobile terminal device comprises a first sensing apparatus, the first sensing apparatus is disposed at a holding portion of the mobile terminal device and configured to collect first unlocking information; wherein, the first unlocking information is physiological state feature information of a human body, and is configured to be transmitted to the first sensing apparatus through the human body and compared with first preset unlocking information; the mobile terminal device is further configured to be unlocked when the first unlocking information matches the first preset unlocking information;
wherein, the unlocking system is further configured for:
setting a first preset time;
detecting an input frequency of the first unlocking information within the first preset time;
if the input frequency of the first unlocking information is greater than a preset value of the input frequency, not collecting the first unlocking information within a second preset time.

2. The unlocking system according to claim 1, wherein, the unlocking system is further configured for generating an unlocking confirmation interface, and using the confirmation interface to perform a second confirmation for an operation of unlocking the mobile terminal device.

3. The unlocking system according to claim 1, wherein, the unlocking system is further configured for:
detecting a continuous input time of the first unlocking information within the second preset time;
if the continuous input time of the first unlocking information is greater than a third preset time, collecting the first unlocking information to perform the step of comparing the first unlocking information with the first preset unlocking information.

4. An unlocking method for a mobile terminal device, wherein the unlocking method comprises:
collecting first unlocking information using a first sensing apparatus on a mobile terminal device, wherein the first unlocking information is physiological state feature information of a human body;
comparing the first unlocking information with first preset unlocking information, and if the first unlocking information matches the first preset unlocking information, unlocking the mobile terminal device;
wherein, the unlocking method further comprises:
setting a first preset time;
detecting an input frequency of the first unlocking information within the first preset time;
if the input frequency of the first unlocking information is greater than a preset value of the input frequency, not collecting the first unlocking information within a second preset time.

5. The unlocking method according to claim 4, wherein, the physiological state feature information includes: a blood pressure, a heart rate, and a human body impedance.

6. The unlocking method according to claim 4, wherein, the unlocking method further comprises:
setting a second sensing apparatus in a wearable mobile device, wherein, the second sensing apparatus can be in contact with a human body and perform signal transmission;
transmitting second unlocking information stored in the wearable mobile device through the human body as a transmission medium to the first sensing apparatus;
comparing the second unlock information with second preset unlocking information, if the first unlocking information matches the first preset unlocking information and the second unlocking information matches the second preset unlocking information, unlocking the mobile terminal device.

7. The unlocking method according to claim 4, wherein, the unlocking method further comprises: generating an unlocking confirmation interface, and using the confirmation interface to perform a second confirmation for an operation of unlocking the mobile terminal device.

8. The unlocking method according to claim 4, wherein, the unlocking method further comprises:
detecting a continuous input time of the first unlocking information within the second preset time;
if the continuous input time of the first unlocking information is greater than a third preset time, collecting the first unlocking information to perform the step of comparing the first unlocking information with the first preset unlocking information.

9. A mobile terminal device, wherein, the mobile terminal device comprises a first sensing apparatus, the first sensing apparatus is disposed at a holding portion of the mobile terminal device and configured to collect first unlocking information, wherein the first unlocking information is physiological state feature information of a human body, and is configured to be transmitted to the first sensing apparatus through the human body and compared with first preset unlocking information; the mobile terminal device is further configured to be unlocked when the first unlocking information matches the first preset unlocking information;
wherein, the mobile terminal device is further configured for:
setting a first preset time;
detecting an input frequency of the first unlocking information within the first preset time;
if the input frequency of the first unlocking information is greater than a preset value of the input frequency, not collecting the first unlocking information within a second preset time.

10. The mobile terminal device according to claim 9, wherein, the mobile terminal device is further configured for generating an unlocking confirmation interface, and using the confirmation interface to perform a second confirmation for an operation of unlocking the mobile terminal device.

11. The mobile terminal device according to claim 9, wherein,
the physiological state feature information includes: a blood pressure, a heart rate, and a human body impedance.

12. The mobile terminal device according to claim 9, wherein, the mobile terminal device is further configured for:
comparing second unlock information transmitted through a human body from a wearable mobile device with second preset unlocking information, and being unlocked when the first unlocking information matches the first preset unlocking information and the second unlocking information matches the second preset unlocking information.

13. The mobile terminal device according to claim 9, wherein, the mobile terminal device is further configured for:
detecting a continuous input time of the first unlocking information within the second preset time;
if the continuous input time of the first unlocking information is greater than a third preset time, collecting the first unlocking information to perform the step of comparing the first unlocking information with the first preset unlocking information.

14. The unlocking system according to claim 1, further comprising a wearable mobile device; wherein, the wearable mobile device comprises a second sensing apparatus, the wearable mobile device stores second unlocking information, and the second sensing apparatus is configured to be in contact with the human body to transmit the second unlocking information through the human body to the mobile terminal device; the second unlocking information is configured to be compared with second preset unlocking information; and the mobile terminal device is further configured to be unlocked when the first unlocking information matches the first preset unlocking information and the second unlocking information matches the second preset unlocking information.

* * * * *